Figure 1:
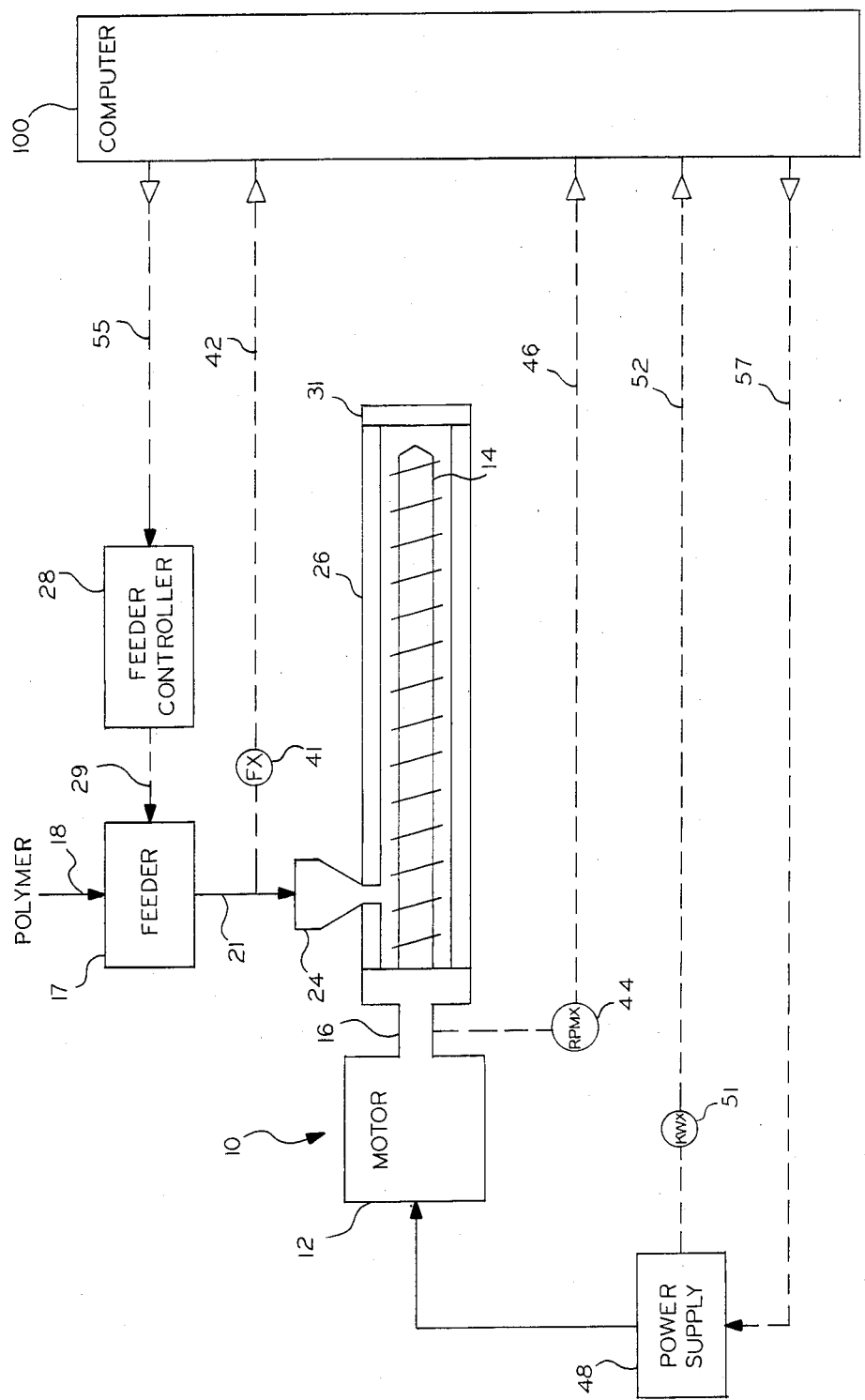

United States Patent [19]

Gwinn et al.

[11] Patent Number: 4,671,908

[45] Date of Patent: Jun. 9, 1987

[54] EXTRUSION CONTROL PROCESS AND APPARATUS

[75] Inventors: J. S. Gwinn; Gary L. Funk, both of Bartlesville, Okla.

[73] Assignee: Phillips Petroleum Company, Bartlesville, Okla.

[21] Appl. No.: 878,755

[22] Filed: Jun. 26, 1986

[51] Int. Cl.⁴ .................. B29G 47/92; B29C 47/10
[52] U.S. Cl. .................. 264/40.7; 264/40.1; 425/135; 425/145; 425/162
[58] Field of Search .............. 264/40.7, 40.1; 425/145, 140, 141, 135, 162

[56] References Cited

U.S. PATENT DOCUMENTS

| | | | |
|---|---|---|---|
| 3,638,916 | 2/1972 | Ursic et al. | 259/4 |
| 3,728,056 | 4/1973 | Theysohn | 425/135 |
| 4,095,156 | 6/1978 | Borisov et al. | 425/135 |
| 4,120,630 | 10/1978 | LaSpisa et al. | 264/40.7 |
| 4,168,290 | 9/1979 | Giles | 264/40.7 |
| 4,209,476 | 6/1980 | Harris | 425/145 |
| 4,213,747 | 7/1980 | Friedrich | 264/40.1 |
| 4,237,082 | 12/1980 | LaSpisa et al. | 264/40.7 |
| 4,290,986 | 9/1981 | Koschmann | 264/40.3 |
| 4,309,114 | 1/1982 | Klein et al. | 366/79 |
| 4,448,736 | 5/1984 | Emery et al. | 264/40.1 |
| 4,510,104 | 4/1985 | Weaver et al. | 264/40.7 |

OTHER PUBLICATIONS

PTC Report #305, Phillips Chemical Co., "Extrusion Screws for K-Resin".
Liptak, B. G., "Instrument Engineer's Handbook", Process Control, 1985, p. 789.

*Primary Examiner*—Jeffery Thurlow
*Attorney, Agent, or Firm*—French and Doescher

[57] ABSTRACT

In an extrusion process, desired product quality parameters are maintained very accurately by manipulating the rotational speed of the screw associated with the extrusion process so as to maintain a desired ratio of feed rate to drag flow in the extrusion process and by manipulating the feed rate of the material to the extrusion process so as to maintain a desired energy input per unit of the material being processed.

10 Claims, 2 Drawing Figures

EXTRUSION CONTROL PROCESS AND APPARATUS

This invention relates to control of an extrusion process. In one aspect, this invention relates to method and apparatus for improving the control of product quality in an extrusion process.

Extrusion processes are utilized in many industries. Examples of extrusion processes are those processes in which thermoplastic resins are melted and forced through a die under pressure to form an article. Such processes are particularly useful in forming elongated articles such as pipes, bars, rods and the like. Other uses of extrusion processes include pelletizing operations where thermoplastic materials are converted into pellets prior to being packaged and shipped to the fabricator.

In many extrusion processes, it is desired to maintain some quality parameter or group of parameters associated with the product exiting the extruder. Examples of quality parameters include a desired modulus or a desired melt index for the product being extruded. In other extrusion operations, where a base material such as a thermoplastic material and additives to the base material are being mixed in an extrusion operation, a desired quality parameter may be the degree of mixing of the additives with the base material.

Many extrusion processes use manual adjustments to maintain desired product quality parameters. However, while manual adjustments may provide the desired control where there are no process upsets or changes in the desired product quality parameters, manual control may result in substantial periods of off-specification product where even small process upsets occur or where changes in the desired product quality parameters are made for business or operating reasons.

Some automatic control systems have been proposed. However, even automatic control systems may result in the production of off-specification product if the proper control variables are not utilized. It is thus an object of this invention to provide an automatic, on-line control system for an extrusion process which substantially minimizes the production of off-specification product by utilizing new control parameters.

In accordance with the present invention, it has been found that desired product quality parameters can be maintained very accurately in an extrusion process by manipulating the rotational speed of the screw associated with the extrusion process so as to maintain a desired ratio of feed rate to drag flow in the extrusion process and by manipulating the feed rate of material to the extrusion process so as to maintain a desired energy input per unit of the material being processed in the extrusion process. Essentially, it has been found that when these two operating parameters are coupled, the parameters can be matched very closely to the desired product quality parameter. As an example, if a particular melt index is required, there is some combination of the ratio of feed rate to drag flow and the energy per unit volume of material which will maintain such desired melt index very accurately.

Figure 2:
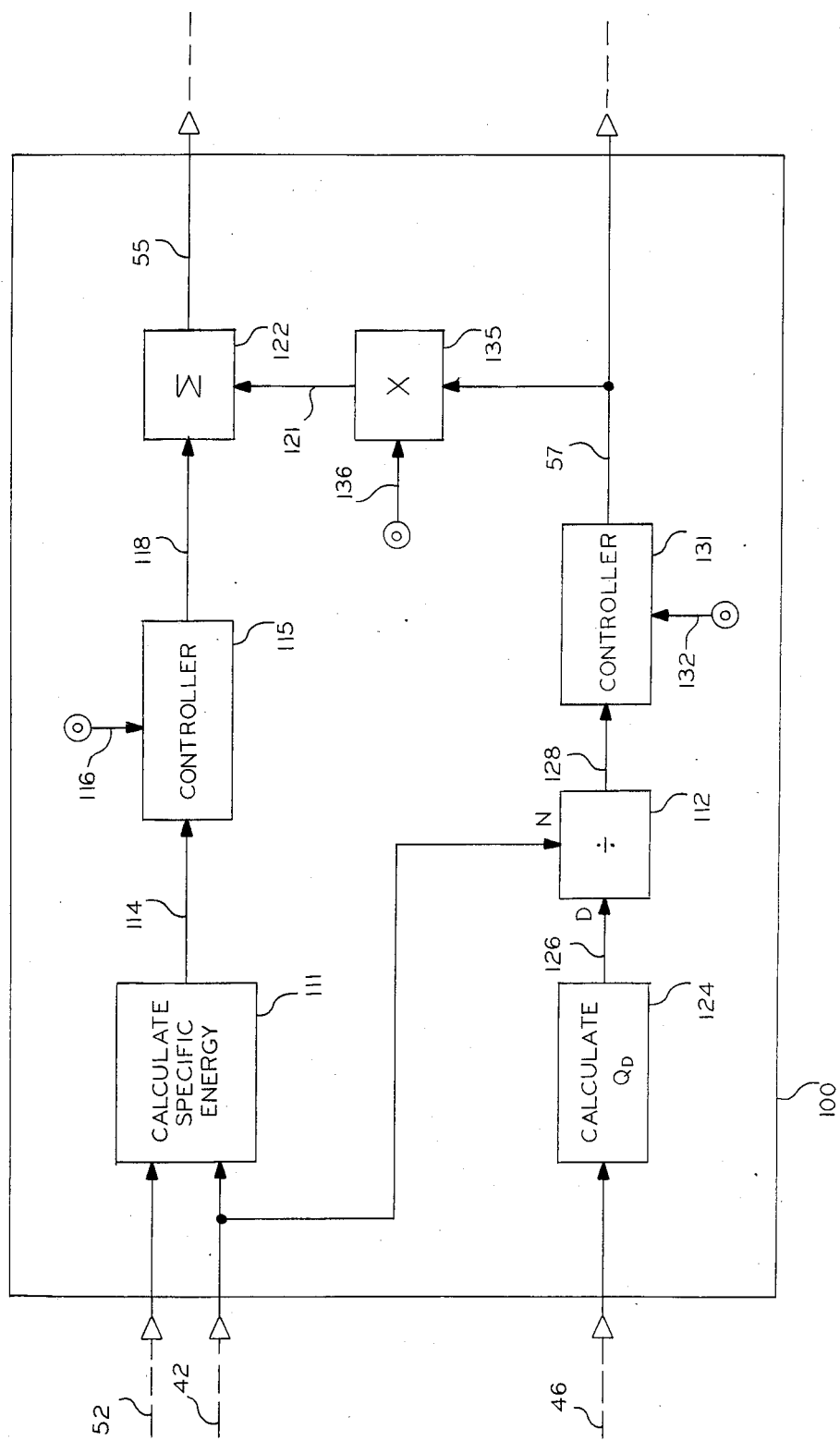

Other objects and advantages of the invention will be apparent from the foregoing brief description of the invention and the claims as well the detailed description of the drawings which are briefly described as follows:

FIG. 1 is a diagrammatic illustration of an extrusion process and the associated control system of the present invention; and FIG. 2 is an illustration of the control logic utilized to generate the control signals illustrated in FIG. 1 based on the process measurements illustrated in FIG. 2.

A specific control system configuration is set forth in FIG. 1 for the sake of illustration. However, the invention extends to different types of control system configuration which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that, if a flow is measured in pneumatic form, it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points to the computer. Analog computers or other types of computing devices could also be used in the invention. The digital computer is preferably an OP-TROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular to FIG. 1, there is illustrated a conventional extruder 10. Again, many different types of extruders are utilized for many different extrusion processes. The present invention relates to control of extruders in general and is not limited to any particular extrusion apparatus.

The extruder 10 has a motor 12 which drives the screw 14. The motor 12 is coupled to the screw 14 through a coupling apparatus illustrated as 16.

The material to be extruded, which is illustrated as a polymer in FIG. 1, but which can be any desired material or combination of materials, is provided to the feeder 17 through conduit 18. The material to be extruded is provided from the feeder 17 through conduit 21 to the hopper 24. The feed flows through the hopper 24 into the barrel 26 which surrounds the helical screw 14.

The rate at which the material to be extruded is provided to the extrusion process is manipulated by means of the feeder controller 28 and control signal 29. The feeder 17 and feeder controller 28 can take many different forms. One type of feeder system is illustrated in U.S. Pat. No. 4,237,082 for a different type of extrusion process. In any event, the particular feeder and feeder controller utilized does not play a part in the present invention and since feeding mechanisms are well known, the feeder and feeder controller will not be described more fully hereinafter.

Many different types of apparatus follow the end of the helical screw in an extrusion process. These different types of apparatus are generally illustrated as adapter 31 but, since the downstream apparatus in the extension process does not play any part in the present invention, such downstream apparatus is not described herein.

Flow transducer 41, which may be any conventional device for determining the flow rate of the material to the extrusion process, provides an output signal 42 which is representative of such flow rate. Flow transducer 41 is ilustrated as being operably connected to conduit 21 but flow transducer 41 may be connected at any point in the extrusion process where a measurement of the flow rate of material to the extension process can be obtained. Signal 42 is provided as a process variable input to the computer 100.

RPM transducer 44 provides an output signal 46 which is representative of the rotational speed of the screw 14. RPM transducer 44 is illustrated as being operably connected to the coupling 16 since this is generally a convenient point in an extrusion process to obtain a measurement of the rotational speed of the screw 14. However, RPM transducer 44 may be connected at any point where such measurement may be obtained. Signal 46 is provided from the RPM transducer 44 as a second process variable input to computer 100.

For the sake of description, power supply 48, which supplies power to the motor 12, is assumed to be electrical. However, any suitable power and driving mechanism for the helical screw 14 could be utilized.

Kilowatt transducer 51 provides an output signal 52 which is representative of the electrical energy being supplied to the motor 12. Signal 52 is provided as a third process variable input to computer 100.

In response to the described process variable inputs and other set points and constants which will be described hereinafter, computer 100 provides two process control signals for the extrusion process illustrated in FIG. 1. Signal 55 is representative of the rate at which material should be provided to the extrusion process. The feeder controller 28 manipulates such rate by control of the feeder 17 in response to signal 55.

Signal 57 is representative of the power which should be supplied to the motor 12 in this specific embodiment but signal 57 is broadly representative of the power which should be applied to the screw 14 in order to maintain a desired rotational speed for the screw 14. More broadly and fundamentally, signal 57 is representative of the desired rotational speed of the screw 14. In other words, a signal representative of desired power is equivalent to a signal representative of desired rotational speed since a particular power input results in a particular rotational speed. Power supply 48 is manipulated in response to signal 57 so as to maintain a desired energy input into the motor 12 which will result in a desired rotational speed for the screw 14.

As an alternative, signal 57 could also be representative of the speed of the motor 12 required to maintain a desired rotational speed for the screw 14. The speed of the motor 12 would then be manipulated. However, again, signal 57 would be fundamentally representative of the desired rotational speed of the screw 14 since a particular motor speed will result in a particular rotational speed of the screw when other operating conditions are held constant.

Mechanisms for controlling material flow to the extrusion process in response to a signal representative of the desired material flow are well known. In like manner, mechanisms for controlling the supplying of energy to a motor in response to a signal representative of the desired amount of energy to be supplied to a motor are well known. In view of this and in view of the fact that the particular mechanism for manipulating the flow of material to the extrusion process or manipulating the supplying of energy to the extrusion process are not a novel part of the present invention, such mechanisms will not be described more fully hereinafter.

Before referring specifically to FIG. 2, it is again noted that the two important control variables are the energy provided to the extrusion process per unit volume of the material passing through the extrusion process and the ratio of the feed rate of the material to the extrusion process to the drag flow. The energy supplied per unit volume of material (Specific Energy) is given by Equation 1.

$$\text{Specific Energy} = \frac{\text{Horsepower} - \text{hour}}{\text{Lbs. Material}} \quad (1)$$

where

Horsepower-hour = the energy supplied to the screw 14; and

Lbs. Material = the amount of material to which the energy is applied.

For the particular apparatus illustrated in FIG. 1, Specific Energy is given by Equation 2.

$$\text{Specific Energy} = \frac{(\text{Kilowatts}/.746)(\text{Motor Efficiency})}{\text{Material Flow Rate}} \quad (2)$$

where

Kilowatts = signal 52;

Motor Efficiency = the efficiency of motor 12 (typically about 0.87–0.90 and

Material Flow Rate = signal 42 (Material Flow Rate is also referred to as MFR).

With respect to the ratio of the feed rate of the material to the extrusion process to the drag flow, the feed rate of the material is given by signal 42. The drag flow, which is well known in the art of extrusion, is the theoretical flow of material through the extrusion process if there were no apparatus such as the adapter 31 at the end of the helical scrw 14 (free flow of material past the helical screw 14). Drag flow, which is referred to as $Q_D$, is given by Equation 3.

$$Q_D = \pi(\text{DIA})(\text{FH})(S)(\text{SG})(\text{RPM}) \quad (3)$$

where

DIA = the total diameter of the helical screw 14;
FH = the flight height (height of the screw portion of the helical screw 14);
SG = the specific gravity of the material being processed in the extrusion process;
RPM = signal 46;
S = the result of Equation 4.

$$S = (\text{pitch} - \text{FW}/\cos \phi)$$

where
pitch = the pitch of the helical screw 14;

FW = the flight width of the screw portion of the helical screw 14; and
$\phi = 17°$ 39 minutes.

All of Equation 3 will be a constant for any particular extrusion operation except for the specific gravity of the material being extruded and the speed of the screw. In many cases, the specific gravity of the material being extruded will also be substantially constant and will be assumed to be constant for purposes of the present description. However, specific gravity could be measured on line if desired. Thus, Equation 3 reduces to a constant times the speed of the screw in actual operation.

Referring now to FIG. 2, signal 52, which is representative of kilowatts in Equation 2, is supplied as a first input to the calculate Specific Energy block 111. Signal 42, which is representative of material flow rate in Equation 2, is supplied as a second input to the calculate Specific Energy block 111 and is also supplied to the numerator input of the dividing block 112.

In response to signals 52 and 42, the Specific Energy is calculated in block 111 in accordance with Equation 2. Signal 114, which is representative of the Specific Energy (energy being supplied to the extrusion process per unit of the material passing through the extrusion process), is supplied as the process variable input to the controller 115.

The controller 115 is supplied with a set point signal 116 which is representative of the desired magnitude of signal 114. The manner in which the set point signal is derived will be described more fully hereinafter.

In response to signals 114 and 116, controller 115 provides an output signal 118 which is responsive to the difference between signals 114 and 116. Signal 118 is scaled so as to be representative of any change in the feed rate of the material to the extrusion process, as represented by signal 121 which will be described hereinafter, required to maintain the actual Specific Energy for the extrusion process as represented by signal 114 substantially equal to the desired Specific Energy as represented by signal 116. Signal 118 is supplied from the controller block 115 as a first input to the summing block 122.

Signal 46, which is representative of RPM in Equation 3, is supplied as an input to the calculate $Q_D$ block 124. $Q_D$ is calculated in block 124 in response to signal 46 and in accordance with Equation 3. Signal 126, which is representative of $Q_D$, is supplied from the calculate $Q_D$ block 124 to the denominator input of the dividing block 112.

Signal 42 is divided by signal 126 in dividing block 112 to establish signal 128. Signal 128 is representative of the actual ratio of the feed rate of material to the extrusion process to $Q_D$ (MFR/$Q_D$). Signal 128 is supplied as the process variable input to the controller 131.

The controller 131 is supplied with a set point signal 132 which is representative of the desired magnitude of MFR/$Q_D$. In response to signals 128 and 132, the controller 131 provides an output signal 57 which is responsive to the difference between signals 128 and 132. Signal 57 is scaled so as to be representative of the power which should be supplied to the motor 12 in order to maintain the speed of rotation of the helical screw 14 required to maintain the actual MFR/$Q_D$ substantially equal to the desired MFR/$Q_D$. Again, signal 57 is broadly representative of the desired rotational speed of the screw 14. Signal 57 is supplied as a first input to the multiplying block 135 and is also utilized as a control signal as previously described.

There is a general relationship between power supplied to the motor 12 and feed rate of material to the extrusion process. This general relationship is determined experimentally for any particular extrusion process and the relationship is represented by signal 136 which is supplied as a second input to the multiplying block 135. Signal 57 is multiplied by signal 136 to establish signal 121 which is again representative of a feed flow rate.

Signal 121 is summed with signal 118 in the summing block 122 to establish signal 55 which is representative of the desired flow rate of material to the extrusion process. Signal 55 is utilized as previously described.

Essentially, signal 57 is utilized directly to control the power supplied to the extrusion process. Also, signal 57 is utilized to derive an approximation of the desired feed rate of material to the extrusion process and this approximation is represented by signal 121. However, such approximation will generally not be sufficiently accurate to maintain the desired quality control and thus signal 118 is utilized to trim signal 121 so as to insure that a desired specific energy input into the extrusion process is maintained.

Lags may be needed in the control logic illustrated in FIG. 2 to decouple control signals 55 and 57. However, since such decoupling is conventional and well known, it will not be described more fully.

As previously stated, the purpose of the control system of the present invention is to maintain a desired quality parameter or group of quality parameters. This is essentially accomplished by the use of set point signals 116 and 132. In operation, the magnitude of a particular product quality parameter such as melt index is noted at a particular time. At this same time, the Specific Energy and $MFR/Q_D$ is noted. This process is continued until a relationship between a product quality parameter and the process variable pair (Specific Energy and $MRF/Q_D$) is determined. This relationship is then utilized to determine the magnitude of signals 116 and 132 based on the desired value of the product quality parameter. It has been found that this particular process variable pair will maintain the desired product quality parameter with substantial accuracy.

In summary, control based on a process variable pair (Specific Energy and $MFR/Q_D$) is utilized to maintain a desired product quality parameter or group of parameters. The control system is extremely accurate and provides a substantial economic benefit in substantially minimizing the production of off-specification product in an extrusion process.

Reasonable variations and modifications are possible within the scope of the foregoing disclosure, the drawings and the appended claims to the invention.

That which is claimed is:

1. Apparatus comprising:
    an extruder having a screw;
    means for supplying material to said extruder, wherein said material is forced through said extruder by the rotation of said screw;
    means for establishing a first signal representative of the ratio of the flow rate of said material to said extruder to the drag flow for said extruder ($MFR/Q_D$);
    means for establishing a second signal representative of the desired value of $MFR/Q_D$;
    means for comparing said first signal and said second signal and for establishing a third signal which is responsive to the difference between said first signal and said second signal, wherein said third signal is scaled so as to be representative of the rotational speed of said screw required to maintain the actual value of $MFR/Q_D$ substantially equal to the desired value represented by said second signal;
    means for manipulating the rotational speed of said screw in response to said third signal;
    means for converting said third signal to a fourth signal which is representative of the flow rate of material to said extruder which corresponds to the rotational speed of said screw;
    means for establishing a fifth signal representative of the actual energy supplied to said extruder per unit volume of said material passing through said extruder (Specific Energy);
    means for establishing a sixth signal representative of the desired Specific Energy;
    means for comparing said fifth signal and said sixth signal and for establishing a seventh signal which is responsive to the difference betwen said fifth signal and said sixth signal, wherein said seventh signal is scaled so as to be representative of changes in the flow rate of material to said extruder represented by said fourth signal required to maintain the actual Specific Energy substantially equal to the desired Specific Energy represented by said sixth signal;
    means for combining said fourth signal and said seventh signal to establish an eighth signal representative of the desired flow rate of said material to said extruder; and
    means for manipulating the flow rate of said material to said extruder in response to said eighth signal, wherein the manipulation of the flow rate of said material to said extruder in response to said eighth signal and the manipulation of the rotational speed of said screw in response to said third signal maintains at least one desired product quality parameter for said material being extruded from said extruder.

2. Apparatus in accordance with claim 1 wherein said means for establishing said first signal comprises:
    means for establishing a ninth signal representative of the actual flow rate of said material to said extruder (MFR);
    means for establishing a tenth signal representative of the actual rotational speed of said screw;
    means for establishing an eleventh signal representative of $Q_D$ in response to said tenth signal; and
    means for dividing said ninth signal by said eleventh signal to establish said first signal.

3. Apparatus in accordance with claim 2 wherein said means for establishing said fifth signal comprises:
    means for establishing a twelfth signal representative of the energy applied to said screw; and
    means for dividing said twelfth signal by said ninth signal to establish said fifth signal.

4. Apparatus in accordance with claim 1 wherein said screw is driven by a motor, wherein said means for manipulating the rotational speed of said screw in response to said third signal comprises means for controlling the power supplied to said motor and thus applied to said screw in response to said third signal, and wherein the scaling of said third signal so as to be representative of the rotational speed of said screw is accomplished by scaling said third signal so as to be representative of the power which should be applied to said motor in order to maintain the rotational speed of said screw required to maintain the actual value of MFR/$Q_D$ substantially equal to the desired value represented by said second signal.

5. Apparatus in accordance with claim 1 wherein said means for combining said fourth signa and said seventh signal comprises means for summing said fourth signal and said seventh signal.

6. A method for maintaining at least one desired product quality parameter for a material being extruded from an extruder, wherein said material is supplied to said extruder and forced through said extruder by the rotation of a screw, said method comprising the steps of:

establishing a first signal representative of the ratio of the flow rate of said material to said extruder to the drag flow for said extruder (MFR/$Q_D$);

establishing a second signal representative of the desired value of MFR/$Q_D$;

comparing said first signal and said second signal and establishing a third signal which is responsive to the difference between said first signal and said second signal, wherein said third signal is scaled so as to be representative of the rotational speed of said screw required to maintain the actual value of MFR/$Q_D$ substantially equal to the desired value represented by said second signal;

manipulating the rotational speed of said screw in response to said third signal;

converting said third signal to a fourth signal which is representative of the flow rate of material to said extruder which corresponds to the rotational speed of said screw;

establishing a fifth signal representative of the actual energy supplied to said extruder per unit volume of said material passing through said extruder (Specific Energy);

establishing a sixth signal representative of the desired Specific Energy;

comparing said fifth signal and said sixth signal and establishing a seventh signal which is responsive to the difference between said fifth signal and said sixth signal, wherein said seventh signal is scaled so as to be representative of changes in the flow rate of material to said extruder represented by said fourth signal required to maintain the actual Specific Energy substantially equal to the desired Specific Energy represented by said sixth signal;

combining said fourth signal and said seventh signal to establish an eighth signal representative of the desired flow rate of said material to said extruder; and manipulating the flow rate of said material to said extruder in response to said eighth signal, wherein the manipulation of the flow rate of said material to said extruder in response to said eighth signal and the manipulation of the rotational speed of said screw in response to said third signal maintains said at least one desired product quality parameter for said material being extruded from said extruder.

7. A method in accordance with claim 6 wherein said step of establishing said first signal comprises:

establishing a ninth signal representative of the actual flow rate of said material to said extruder (MFR);

establishing a tenth signal representative of the actual rotational speed of said screw;

establishing an eleventh signal representative of $Q_D$ in response to said tenth signal; and dividing said ninth signal by said eleventh signal to establish said first signal.

8. A method in accordance with claim 7 wherein said step of establishing said fifth signal comprises:

establishing a twelfth signal representative of the energy applied to said screw; and dividing said twelfth signal by said ninth signal to establish said fifth signal.

9. A method in accordance with claim 6 wherein said screw is driven by a motor, wherein said step of manipulating the rotational speed of said scrw in response to said third signal comprises controlling the power supplied to said motor and thus applied to said screw in response to said third signal, and wherein the scaling of said third signal so as to be representative of the rotational speed of said screw is accomplished by scaling said third signal so as to be representative of the power which should be applied to said motor in order to maintain the rotational speed of said screw required to maintain the actual value of MFR/$Q_D$ substantially equal to the desired value represented by said second signal.

10. A method in accordance with claim 6 wherein said step of combining said fourth signal and said seventh signal comprises summing said fourth signal and said seventh signal.

* * * * *